April 7, 1925.  1,532,264
P. RIEDELE
BUMPER
Filed Nov. 13, 1923  2 Sheets-Sheet 1
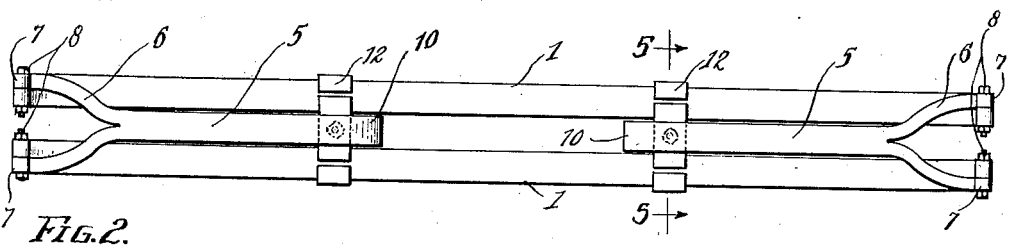
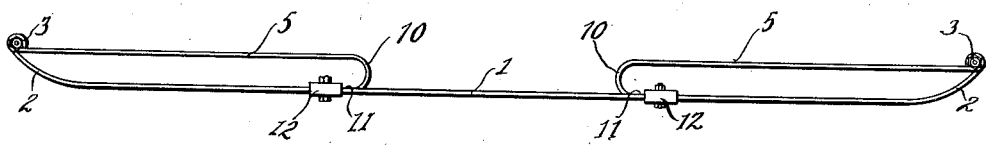
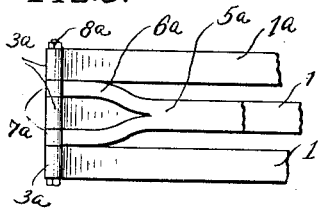
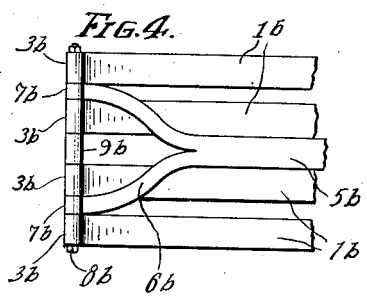
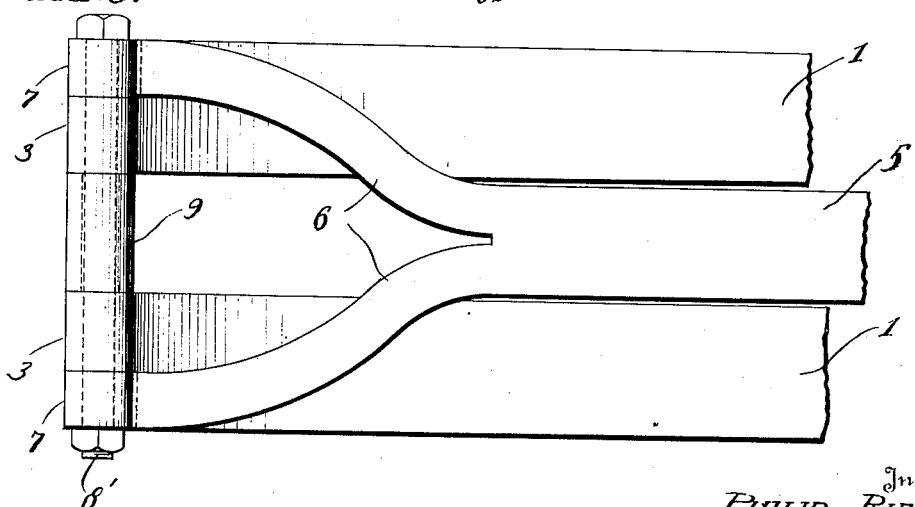
Inventor
PHILIP RIEDELE
By Lyon & Lyon
Attorney April 7, 1925.

P. RIEDELE

BUMPER

Filed Nov. 13, 1923

Inventor
PHILIP RIEDELE
By Lyon+Lyon
Attorneys

Patented Apr. 7, 1925.

1,532,264

UNITED STATES PATENT OFFICE.

PHILIP RIEDELE, OF LOS ANGELES, CALIFORNIA, ASSIGNOR TO UNITED STATES BUMPER COMPANY, INC., OF LOS ANGELES, CALIFORNIA, A CORPORATION OF CALIFORNIA.

BUMPER.

Application filed November 13, 1923. Serial No. 674,458.

*To all whom it may concern:*

Be it known that I, PHILIP RIEDELE, a citizen of the United States, residing at Los Angeles, in the county of Los Angeles and State of California, have invented a new and useful Bumper, of which the following is a specification.

This invention relates to automobile bumpers and particularly to the bumpers of the character described which are adapted for attachment to the front or rear end of an automobile for the purpose of protecting the automobile from collision with other vehicles or objects by absorbing the force or effect of such collision or impact through the inherent resiliency of a part or structure of the bumper.

An object of this invention is to provide a bumper construction having a great deal of strength and capable of absorbing a considerable impact force through the resiliency of the parts forming the bumper construction and without permanently distorting said bumper construction or parts so that after such impact or collision the bumper may return to its original shape and position on the vehicle.

More specifically, an object of this invention is to provide an automobile bumper of the double or plurality impact bar type, that is the type of bumper having a number of spaced apart vertically aligned impact bars, which automobile bumper embodies a resilient loop structure, to the rear of the impact section, connected to the forward impact section at vertically spaced points so that a force or impact applied only to one of the vertically aligned impact bars may be properly translated to the resilient loop structure without causing a twisting of the impact section around a horizontal axis resulting in a strain or permanent distortion of the bumper parts.

A further object of the invention is to provide a bumper structure whereby a force of impact or collision may be uniformly distributed from the forward impact member to the second impact or equalizing members of the bumper.

Various other objects and advantages of the invention will be apparent from the description of the preferred embodiments of the invention and will present themselves through the use or practice of the invention.

In the accompanying drawings we have illustrated the invention in its preferred forms or embodiments of which Figure 1 is a rear elevation of one embodiment of the invention illustrating the duplex impact type.

Fig. 2 is a plan view of the bumper shown in Figure 1.

Fig. 3 is a rear elevation of the end connections for a bumper having three forward aligned impact bars.

Fig. 4 is a rear elevation of the end connections for four forwardly aligned impact bars.

Fig. 6 is a rear elevation of a modified connection between a duplex bumper front and the secondary impact or equalizing member.

Figure 7:
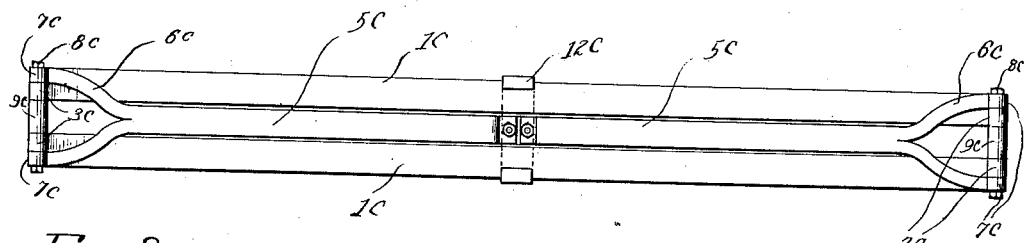
Fig. 7 is a rear elevation of a duplex bumper construction in which the equalizing or secondary impact members are slightly modified in construction.
Figure 8:
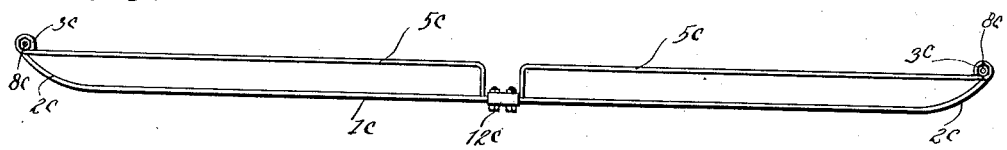
Fig. 8 is a plan view of Figure 7.
Figure 9:
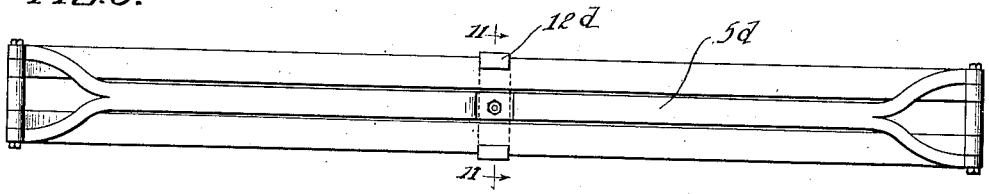
Fig. 9 is a further modification of the bumper.
Figure 10:
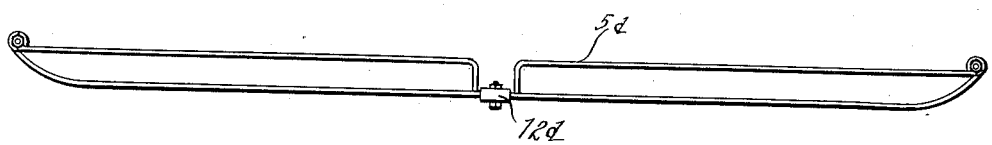
Fig. 10 is a plan view of Figure 9.
Figure 5:
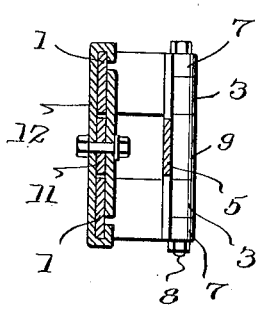
Fig. 5 is a section on the line 5—5 of Fig. 1.
Figure 11:
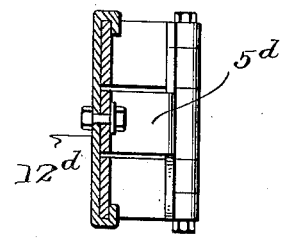
Fig. 11 is an enlarged section on the line 11—11 of Fig. 9.

Referring first to the embodiment of the invention disclosed in figures 1 and 2 the bumper construction comprises a plurality of resilient impact bars which are adapted to extend laterally across a vehicle and are of substantially greater height than width so that said bars 1 may reflex or yield in horizontal directions but are comparatively non-yielding in a vertical direction. The bars 1 are preferably spaced vertically apart and parallel and vertically aligned. The major portions of the impact bars 1 are substantially straight across the bumper structure but at their opposed ends are bent rearwardly as indicated at 2 and terminate in eyes 3. The ends of the bars 1 being bent rearwardly the eyes 3 of the impact bars 1 are disposed to the rear and a normal impact force can be taken up by the bars 1 without damage to the eyes 3.

The impact bars 1 are carried by secondary impact or equalizing bars 5 which are disposed in the rear of the bars 1. Said bars 5 are provided with a forked yoke end 6. One arm of the yokes 6 extends above the upper eye 3 and the other arm extends below the lower eye 3. The yoke ends terminate in eyes 7 vertically aligning with the eyes 3 of the bars 1 and are connected to bolts or pins 8 extending therethrough. Bolts or pins 8' may extend through both eyes 3 of the impact bars 1 and both eyes 7 of the yokes 5 (as shown in Figure 6) in which case a sleeve or spacer 9 is disposed between the bars 1 to hold the same spaced apart; or separate bolts or pins 7 may be employed for holding each eye 3 to one of the eyes 7. By the use of the forked yoke 6 the secondary impact bars 5 are connected to the forward impact structure at spaced points and provide a means for preventing the impact structure from being excessively bent or twisted around a horizontal axis when an impact thrust is applied to only one of the front or forward impact bars. Each secondary impact bar 5 extends from the pins 7 in a direction substantially parallel with the forward impact bars 1 and the ends of the bars 5 are bent forwardly and back as indicated at 10 forming a resilient spring loop, the bar terminating in an end 11 positioned between and aligned with the forward impact bars 1. Plates 12 are secured to the bars 1 and said ends 11 to rigidly connect the bars 1 with the ends 11. Each rear impact bar 5 preferably extends in a horizontal direction a distance equal to about one-third the length of the forward impact bars 1 and is joined to the front bars 1 at a point spaced from the end a distance equal to one-third of the length of said bars 1. In this manner the front impact bars 1 are supported from the rear bars 5 at four points equally spaced apart and the maximum strengthening of such bars 1 through the rear bars 5 is provided.

As best shown in Figure 6 to prevent the bars 5 extending above or below the forward bumper structure, the eyes 3 of impact bars 1 should be about half the height of the bars 1 and the eyes 7 of about equal height so that the eyes 7 on the yokes 6 will not extend above or below the vertical edges of said bars 1.

In the embodiment of the invention shown in Figure 3 I have illustrated a three bar impact structure. Three forward impact bars 1ª are connected to rear impact bars 5ª having yokes 6ª, the ends of which terminate in eyes 7ª disposed between eyes 3ª of the outer two bars 1ª and the central bar 1ª. The fork bar structure shown in Figure 4 embodies four forward impact bars 1ᵇ terminating in eyes 3ᵇ which are in alignment with eyes 7ᵇ on the extremities of a fork or yoke end 6ᵇ of a rear impact bar 5ᵇ.

In the four bar type it is preferable to extend the yoke ends 6ᵇ to between the first and second and third and fourth impact bars 1ᵇ and between the second and third bars place a sleeve or spacer 9ᵇ, the entire joint being through a common bolt or pin 8ᵇ.

In the form shown in Figure 7 parallel and vertically aligned impact bars 1ᶜ are spaced vertically apart and provided with rearwardly curved ends 2ᶜ terminating in eyes 3ᶜ. To the rear of the bars 1ᶜ and preferably and substantially parallel with the major portion of said bars are provided secondary impact bars 5ᶜ which are bolted or riveted to a common spacer 12ᶜ at substantially the center of the forward impact structure and are provided with forked or yoked extremities 6ᶜ at their opposed ends. Said yokes 6ᶜ terminate in eyes 7ᶜ aligning with the eyes 3ᶜ of the impact bars 1 and extend around opposite ends of said eyes where a common bolt or pin 8ᶜ pivotedly unites the same together.

In the embodiment shown in 9 and 10 the rear impact bars 5ᵈ are formed in one integral piece bolted or secured to a spacer 12ᵈ at the center of the bar. While the bar 5ᵈ is made in one integral part, it will be observed that there are still provided two closed spring structures and thus the opposed halves of the integral impact bar 5ᵈ act partly as two rear impact members.

It is thus seen that the multiple front bar structures together with the secondary impact structures form two closed spring impact loops and that the opposed ends of the front loops are united to the rear bars at vertically spaced points. Such a bumper embodies adequate shock absorbing powers while still providing such structure that excessive twisting of the front impact structure around a horizontal axis transverse to the vehicle is eliminated.

While the embodiments of the invention herein described are well suited for the purposes of this invention, various modifications may be made within the spirit of the invention. The invention is not therefore limited to the specific embodiments described, but is of the scope set forth in the following claims:

I claim:

1. An automobile bumper comprising a plurality of vertically spaced resilient impact bars and secondary resilient bars spaced rearwardly of the impact bars and having one end provided with forked yokes pivoted to said impact bars and the other end secured to a medial section of the impact bars.

2. An automobile bumper comprising a forwardly disposed impact section having a plurality of vertically spaced resilient bars bent rearwardly at their opposed ends, and resilient secondary impact bar sections connected to a medial section of the forward impact member, bent rearwardly and having pivoted forked yoke connections with the opposed ends of said forward impact section.

3. An automobile bumper comprising a multiple front resilient impact bar structure having its opposed ends bent rearwardly, and a secondary resilient impact structure supporting the forward structure intermediate the ends thereof and having forked yoke ends pivotally connected to the front impact structure at vertically spaced points, said rear impact structure forming with the front structure two horizontally spaced resilient closed spring structures.

4. An automobile bumper comprising a plurality of continuous vertically aligned bars adapted to extend horizontally across an automobile end, the ends of said bars being bent rearwardly and terminating in eyes, and loop forming bars having one end terminating in a forked yoke with eyes at the end pivotally united to the first mentioned bars at vertically spaced points by pins, the other ends of said bars being bent forwardly and connected to the first mentioned bars at a medial section thereof.

5. An automobile bumper comprising a plurality of resilient impact bars with their faces disposed in substantially the same vertical plane and with their ends bent rearwardly and terminating in eyes, secondary impact bars, the major portions of which are substantially parallel with the first bars, said secondary bars having forked yokes at one end terminating in eyes adjacent the eyes of the first bars and spaced apart vertically, pins connecting the eyes of the secondary bars to the eyes of the first bars, said secondary bars being bent forwardly at their other ends and fixed to the first bars at spaced apart points.

6. An automobile bumper comprising a plurality of vertically spaced resilient bars, terminating in eyes at their ends, the upper eye being recessed at the upper end and the lower eye being recessed at the lower end, and a secondary bar having forked ends extending above and below said eyes and fitting said recesses.

7. An automobile bumper comprising a plurality of vertically aligned bars, and a secondary bar having a forked end joined to the ends of the front bars above and below the bars.

8. An automobile bumper comprising a front impact structure composed of a plurality of bars vertically aligned and spaced apart, the ends of said bars being bent rearwardly, spaced apart, and terminating in vertically aligned eyes, the upper eye being recessed at the upper end and the lower eye being recessed at the lower end, secondary impact bars having forked ends terminating in eyes fitting said recesses, the secondary bars extending from their forked ends first in the same direction as the front bars and then bent forward and joined to spaced apart points on the front structure, pins pivotally uniting the eyes, and a spacer on the pins and between the front bars.

Signed at Los Angeles, California this 30th day of October, 1923.

PHILIP RIEDELE.